United States Patent
Dalsgaard et al.

(10) Patent No.: US 8,977,262 B2
(45) Date of Patent: Mar. 10, 2015

(54) METHOD, APPARATUS AND COMPUTER PROGRAM PRODUCT FOR PROVIDING CLOSED SUBSCRIBER GROUP ACCESS CONTROL

(75) Inventors: Lars Dalsgaard, Oulu (FI); Jarkko T. Koskela, Oulu (FI); Benoist Pierre Sebire, Tokyo (JP)

(73) Assignee: Nokia Solutions and Networks Oy, Espoo (FI)

( * ) Notice: Subject to any disclaimer, the term of this patent is extended or adjusted under 35 U.S.C. 154(b) by 276 days.

(21) Appl. No.: 13/120,947

(22) PCT Filed: Sep. 26, 2008

(86) PCT No.: PCT/IB2008/053942
§ 371 (c)(1),
(2), (4) Date: Mar. 25, 2011

(87) PCT Pub. No.: WO2010/035069
PCT Pub. Date: Apr. 1, 2010

(65) Prior Publication Data
US 2011/0183647 A1    Jul. 28, 2011

(51) Int. Cl.
H04W 4/00 (2009.01)
H04L 29/06 (2006.01)
H04J 11/00 (2006.01)
H04W 12/08 (2009.01)
H04W 4/06 (2009.01)
H04W 48/02 (2009.01)

(52) U.S. Cl.
CPC ........... *H04L 63/104* (2013.01); *H04J 11/0093* (2013.01); *H04W 12/08* (2013.01); *H04W 4/06* (2013.01); *H04W 48/02* (2013.01)
USPC ...................................... 455/435.1

(58) Field of Classification Search
USPC ............... 455/435.1, 436–444, 432.1, 434
See application file for complete search history.

(56) References Cited

U.S. PATENT DOCUMENTS 8,072,953 B2 * 12/2011 Mukherjee et al. ........... 370/338
2007/0037577 A1   2/2007 Dalsgaard et al. ............ 455/436

(Continued)

FOREIGN PATENT DOCUMENTS

WO   WO 2008/134281 A2   11/2008
WO   WO 2009/022971 A1    2/2009

OTHER PUBLICATIONS

TSG RAN WG2: "LS on Closed Subscriber Groups for LTE Home cells" 3GPP Draft; R3-071320—R2-072991, Aug. 9, 2007, XP050162160, (2 pages).

(Continued)

*Primary Examiner* — Brandon Miller
(74) *Attorney, Agent, or Firm* — Harrington & Smith

(57) ABSTRACT

An apparatus for providing closed subscriber group access control may include a processor. The processor may be configured to maintain a non-access register including an identifier of a communication cell associated with a closed subscriber group to which a communication device associated with the non-access register does not have access rights, and enable subsequent communication with another communication cell based on the other communication cell not being identified in the non-access register. A corresponding method and computer program product are also provided.

15 Claims, 4 Drawing Sheets

(56) References Cited

U.S. PATENT DOCUMENTS

2009/0047960 A1* 2/2009 Gunnarsson et al. ......... 455/436
2009/0086672 A1* 4/2009 Gholmieh et al. ............ 370/329
2009/0104905 A1* 4/2009 DiGirolamo et al. ......... 455/434
2009/0270092 A1* 10/2009 Buckley et al. ............... 455/434
2010/0323663 A1* 12/2010 Vikberg et al. ............... 455/410

OTHER PUBLICATIONS

3GPP TS 36.304, V8.1.0 (Mar. 2008), $3^{rd}$ Generation Partnership Project; Technical Specification Group Radio Access network; Evolved Universal Terrestrial Radio Access (E-UTRA); User Equipment (UE) procedures in idle mode (Release 8), 29 pgs.

* cited by examiner

METHOD, APPARATUS AND COMPUTER PROGRAM PRODUCT FOR PROVIDING CLOSED SUBSCRIBER GROUP ACCESS CONTROL

TECHNOLOGICAL FIELD

Embodiments of the present invention relate generally to communications technology and, more particularly, relate to an apparatus, method and computer program product for enabling control over closed subscriber group access.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. In order to provide easier or faster information transfer and convenience, telecommunication industry service providers are developing improvements to existing networks. In this regard, wireless communication has become increasingly popular in recent years due, at least in part, to reductions in size and cost along with improvements in battery life and computing capacity of mobile electronic devices. As such, mobile electronic devices have become more capable, easier to use, and cheaper to obtain. Due to the now ubiquitous nature of mobile electronic devices, people of all ages and education levels are utilizing mobile terminals to communicate with other individuals or contacts, receive services and/or share information, media and other content.

Communication networks and technologies have been developed and expanded to provide robust support for mobile electronic devices. For example, the evolved universal mobile telecommunications system (UMTS) terrestrial radio access network (E-UTRAN) is also currently being developed. The E-UTRAN, which is also known as Long Term Evolution (LTE) or 3.9G, is aimed at upgrading prior technologies by improving efficiency, lowering costs, improving services, making use of new spectrum opportunities, and providing better integration with other open standards. In a typical network configuration mobile users communicate with each other via communication links maintained by the network. In this regard, for example, an originating station may typically communicate data to network devices in order for the network devices to relay the data to a target station.

Recently, efforts have been made to enable the provision of closed subscriber groups (CSGs) to enable restricted access to particular CSG cells for particular groups of subscribers. CSGs may be useful for particular organizations or businesses that wish to define a group of users that may be enabled to freely access a base station, node or access point associated with the CSG, but may have restrictions for enabling access to the cell by individuals outside of the group. CSGs may also be useful in connection with individually established networks within private homes. In this regard, for example, a CSG may typically define a group of users (e.g., subscribers) that are enabled to access a particular CSG cell. As such, individuals that are not members of the group may not be able to access the CSG cell. In some situations, subscribers may be members of multiple CSGs. In practice, a CSG may be associated with one or more cells served by access points, base sites or node-Bs that may provide access to subscribers of the CSG.

Current communication standards enable a particular users mobile terminal or user equipment (UE) to discover possible CSG cells with which the UE may attempt to communicate using an autonomous search procedure. UEs may also manually attempt to communicate with CSG cells. The UE may then, if the attempt to communicate is successful, add the CSG or CSG identity to a "whitelist". The whitelist may include a listing of the CSGs to which the UE knows it has access (e.g., either by prior manual access or the network providing the UE with the list by dedicated signaling). However, there is currently no provision for resolution of activities in response to the UE receiving a denial of access to a particular CSG.

Accordingly, it may be desirable to provide a mechanism for enabling improved control over the provision of CSG access.

BRIEF SUMMARY OF EXEMPLARY EMBODIMENTS

A method, apparatus and computer program product are therefore provided that may enable the provision of CSG access control. In this regard, for example, an exemplary embodiment of the present invention may enable the maintenance of a "blacklist" or forbidden list including a listing or identification of CSGs for which the UE has been rejected access. Thus, for example, if the UE attempts to access a CSG and is denied access, the UE may not increase signaling and power consumption or use other network resources to again or repeatedly attempt to access any CSG on the blacklist in the future.

In one exemplary embodiment, a method of providing closed subscriber group access control is provided. The method may include maintaining a non-access register including an identifier of a communication cell associated with a closed subscriber group to which a communication device associated with the non-access register does not have access rights, and enabling subsequent communication with another communication cell based on the other communication cell not being identified in the non-access register.

In another exemplary embodiment, a computer program product for providing closed subscriber group access control is provided. The computer program product includes at least one computer-readable storage medium having computer-executable program code portions stored therein. The computer-executable program code portions may include first and second program code portions. The first program code portion may be for maintaining a non-access register including an identifier of a communication cell associated with a closed subscriber group to which a communication device associated with the non-access register does not have access rights. The second program code portion may be for enabling subsequent communication with another communication cell based on the other communication cell not being identified in the non-access register.

In another exemplary embodiment, an apparatus for providing closed subscriber group access control is provided. The apparatus may include a processor that may be configured to maintain a non-access register including an identifier of a communication cell associated with a closed subscriber group to which a communication device associated with the non-access register does not have access rights, and enable subsequent communication with another communication cell based on the other communication cell not being identified in the non-access register.

In another exemplary embodiment, an apparatus for providing closed subscriber group access control is provided. The apparatus includes means for maintaining a non-access register including an identifier of a communication cell associated with a closed subscriber group to which a communication device associated with the non-access register does not have access rights, and enabling subsequent communication with another communication cell based on the other communication cell not being identified in the non-access register.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
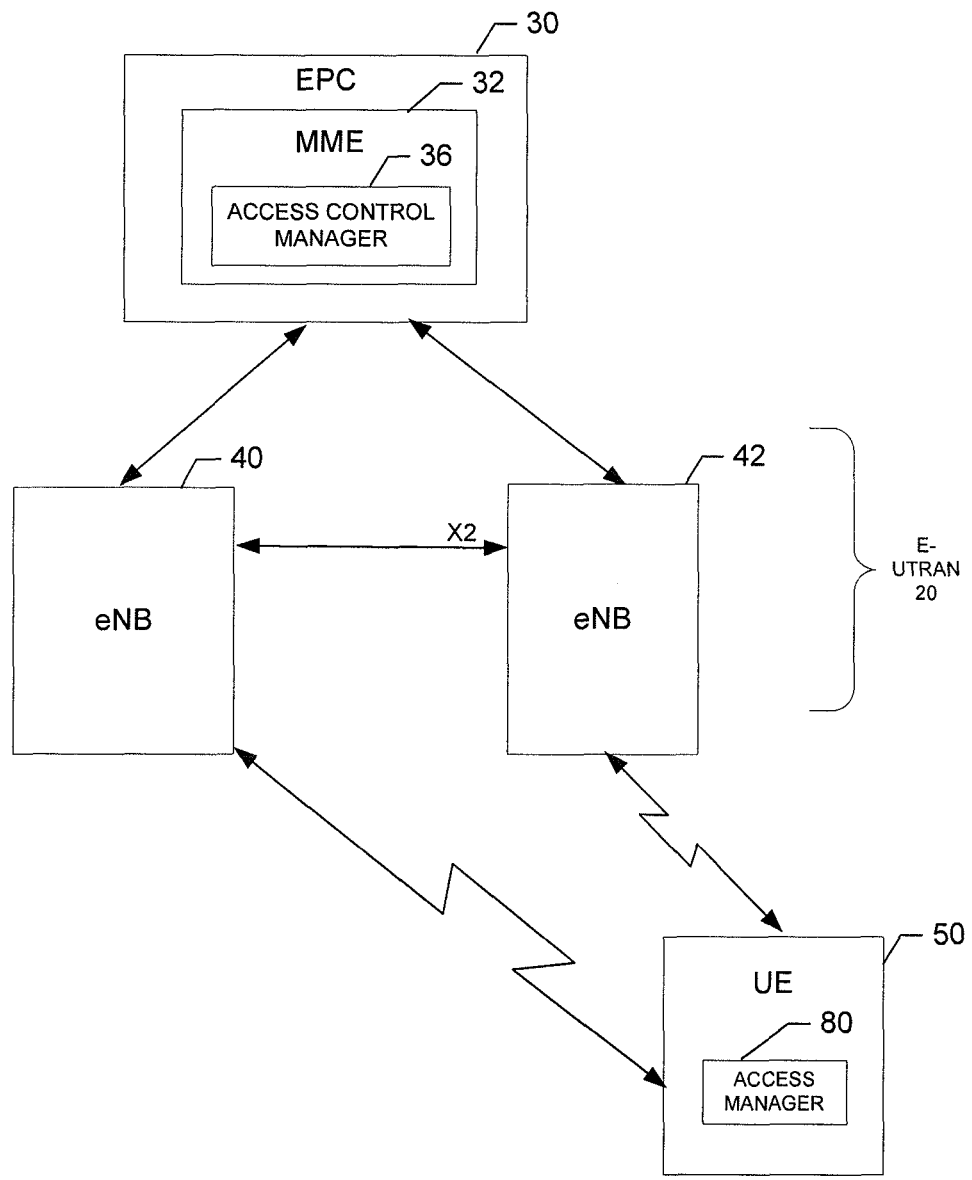
FIG. 1 is a schematic block diagram of a system according to an exemplary embodiment of the present invention.

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention. Moreover, the term "exemplary", as used herein, is not provided to convey any qualitative assessment, but instead merely to convey an illustration of an example. Thus, use of any such terms should not be taken to limit the spirit and scope of embodiments of the present invention.

FIG. 1 illustrates a schematic block diagram showing a system for providing closed subscriber group access control according to an exemplary embodiment of the present invention is provided. However, FIG. 1 is illustrative of one exemplary embodiment, and it should be understood that other architectures including additional or even fewer elements may also be employed in connection with practicing embodiments of the present invention. Furthermore, the system of FIG. 1 illustrates a network embodied as an E-UTRAN, however, any other network could alternatively be substituted in alternative embodiments.

Referring now to FIG. 1, the system may include an E-UTRAN 20 which may include, among other things, a plurality of node-Bs in communication with an EPC 30 which may include one or more mobility management entities (MMEs) such as MME 32 and one or more system architecture evolution (SAE) gateways. The node-Bs may be E-UTRAN node-Bs (e.g., eNBs 40 and 42) and may also be in communication with a UE 50 and one or more other UEs (some of which may be members of a closed subscriber group (CSG)). Although FIG. 1 only shows a specific number of eNBs and UEs, there could be a plurality of nodes and mobile terminals included in the system. The E-UTRAN 20 may be in communication with the EPC 30 as part of an EPS (Evolved Packet System). Moreover, although FIG. 1 shows evolved node-Bs as the access points (APs), any AP or base station (BS) may be employed in connection with embodiments that operate in accordance with other radio access technologies.

In an exemplary embodiment, the UE 50 may be a communication device such as a computer (e.g., a personal computer, laptop, server, or the like), a mobile telephone, global positioning system (GPS) device, a personal digital assistant (PDA), pager, mobile television, gaming device, camera, audio/video player, radio, or any combination of the aforementioned, and other types of electronic devices that may include a processor and/or memory for executing various hardware and/or software processes. The UE 50 may be configured to employ processing in accordance with embodiments of the present invention as described in greater detail below in connection with the description of FIG. 2.

Although not necessary, in some embodiments, the UE 50 may be capable of communicating in accordance with any one or more of a number of first-generation (1G), second-generation (2G), 2.5G, third-generation (3G), 3.5G, 3.9G, fourth-generation (4G) mobile communication protocols, LTE, and/or the like. As such, for example, the UE 50 may communicate with other UEs or network devices via a network and the UE 50 may include an antenna or antennas for transmitting signals to and for receiving signals from a base site, which could be, for example a base station that is a part of one or more cellular or mobile networks or an access point that may be coupled to a data network, such as a local area network (LAN), a metropolitan area network (MAN), and/or a wide area network (WAN), such as the Internet. In turn, other devices such as processing elements (e.g., personal computers, server computers or the like) may be coupled to the UE 50. By directly or indirectly connecting the UE 50 to other devices, the UE 50 may be enabled to communicate with the other devices, for example, according to numerous communication protocols including Hypertext Transfer Protocol (HTTP) and/or the like, to thereby carry out various communication or other functions of the UE 50.

The eNBs 40 and 42 may provide E-UTRA user plane and control plane (radio resource control (RRC)) protocol terminations for the UE 50 and other UEs. The eNBs 40 and 42 may provide functionality hosting for such functions as radio resource management, radio bearer control, radio admission control, connection mobility control, dynamic allocation of resources to UEs in both uplink and downlink, selection of an MME at UE attachment, Internet Protocol (IP) header compression and encryption, scheduling of paging and broadcast information, routing of data, measurement and measurement reporting for configuration mobility, and/or the like. Each eNB may, in some cases, represent a separate cell capable of servicing UEs within the cell with respect to communication services in accordance with E-UTRAN techniques. The cells may overlap in some cases. However, it should be understood that embodiments of the present invention may be applied to numerous wireless access technologies and not just E-UTRAN. Thus, communication cells as described herein may be associated with any AP, BS or node associated with respective different access technologies such as, for example, radio frequency (RF), Bluetooth (BT), Infrared (IR), wireless local area networks (WLAN), Worldwide Interoperability for Microwave Access (WiMAX), WiFi, ultra-wide band (UWB), Wibree, wideband code division multiple access (W-CDMA), CDMA2000, global system for mobile communications (GSM), general packet radio service (GPRS) and/or the like.

The MME 32 may host functions such as distribution of messages to respective node-Bs, security control, idle state mobility control, EPS bearer control, ciphering and integrity protection, and/or the like. In an exemplary embodiment, the MME 32 may include an access control manager 36, which may be configured to determine whether network access is to be allowed or rejected for particular users. The SAE gateway may host functions such as termination and switching of certain packets for paging and support of UE mobility. In an exemplary embodiment, the EPC 30 may provide connection to a network such as the Internet.

In an exemplary embodiment, one or more CSGs may be defined and may be serviced by a particular eNB (e.g., eNBs 40 and 42). Thus, for example, if the UE 50 is in an area (e.g., a cell) where communication with eNB 42 is possible, the UE 50 may be aware that potential communication with the eNB 42 is possible. Similarly, if the UE 50 is in an area where communication with eNB 40 is possible, the UE 50 may also be aware that potential communication with the eNB 40 is possible. However, if the eNBs 40 and 42 are associated with CSGs, access restrictions may apply with respect to the UE 50.

In this regard, for example, if one assumes that eNB 40 is associated with a CSG to which UE 50 does not have access rights, the UE 50 may be prevented from accessing the CSG associated with eNB 40. However, if eNB 42 is associated with a CSG to which the UE 50 has access rights, the UE 50 may be enabled to access the CSG associated with the eNB 42. As such, for example, the eNB 42 may be considered to be associated with an accessible CSG cell with respect to the UE 50 and the eNB 40 may be considered to be associated with a non-accessible cell with respect to the UE 50.

In an exemplary embodiment, the UE 50 may include an access manager (e.g., access manager 80 described in greater detail below), that may be configured to provide CSG access control functionality in accordance with an exemplary embodiment. In this regard, for example, the access manager 80 may be configured to maintain or store identities of cells that are not accessible to the UE 50 in order, for example, to prevent the UE 50 from consuming resources by making multiple access attempts to non-accessible CSG cells. Accordingly, for example, the access manager 80 may store a whitelist including a listing of CSG cells for which the UE 50 has access rights and/or a blacklist or forbidden list including a listing of CSG cells for which the UE 50 does not have access rights.

Figure 2:
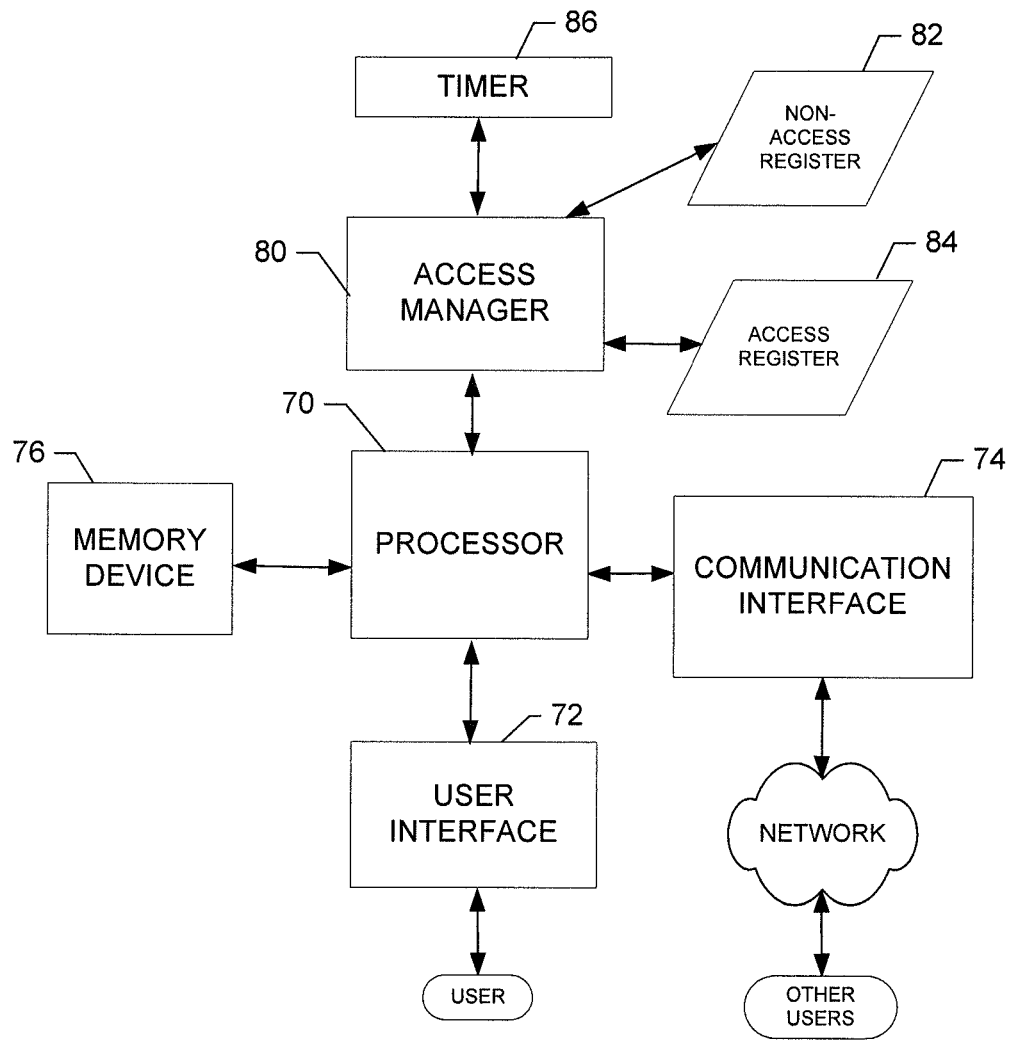
FIG. 2 is a schematic block diagram of an apparatus for providing closed subscriber group access control according to an exemplary embodiment of the present invention.

FIG. 2 shows a block diagram view of one example of an apparatus configured to perform exemplary embodiments of the present invention. In this regard, for example, an apparatus for providing CSG access control according to an exemplary embodiment of the present invention may be embodied as or otherwise employed, for example, on a mobile terminal such as the UE 50. However, it should be noted that the apparatus of FIG. 2, may also be employed on a variety of other devices, both mobile and fixed, and therefore, embodiments of the present invention should not necessarily be limited to application on devices such as mobile terminals. It should also be noted that while FIG. 2 illustrates one example of a configuration of an apparatus for enabling the provision of CSG access control, numerous other configurations may also be used to implement embodiments of the present invention.

Referring now to FIG. 2, an apparatus for enabling the provision of CSG access control is provided. The apparatus may include or otherwise be in communication with a processor 70, a user interface 72, a communication interface 74 and a memory device 76. The memory device 76 may include, for example, volatile and/or non-volatile memory. The memory device 76 may be configured to store information, data, applications, instructions or the like for enabling the apparatus to carry out various functions in accordance with exemplary embodiments of the present invention. For example, the memory device 76 could be configured to buffer input data for processing by the processor 70. Additionally or alternatively, the memory device 76 could be configured to store instructions for execution by the processor 70. As yet another alternative, the memory device 76 may be one of a plurality of databases that store information and/or media content.

The processor 70 may be embodied in a number of different ways. For example, the processor 70 may be embodied as various processing means such as a processing element, a coprocessor, a controller or various other processing devices including integrated circuits such as, for example, an ASIC (application specific integrated circuit), an FPGA (field programmable gate array), a hardware accelerator, or the like. In an exemplary embodiment, the processor 70 may be configured to execute instructions stored in the memory device 76 or otherwise accessible to the processor 70.

Meanwhile, the communication interface 74 may be any means such as a device or circuitry embodied in either hardware, software, or a combination of hardware and software that is configured to receive and/or transmit data from/to a network and/or any other device or module in communication with the apparatus. In this regard, the communication interface 74 may include, for example, an antenna (or multiple antennas) and supporting hardware and/or software for enabling communications with a wireless communication network. In fixed environments, the communication interface 74 may alternatively or also support wired communication. As such, the communication interface 74 may include a communication modem and/or other hardware/software for supporting communication via cable, digital subscriber line (DSL), universal serial bus (USB) or other mechanisms.

The user interface 72 may be in communication with the processor 70 to receive an indication of a user input at the user interface 72 and/or to provide an audible, visual, mechanical or other output to the user. As such, the user interface 72 may include, for example, a keyboard, a mouse, a joystick, a display, a touch screen, a microphone, a speaker, or other input/output mechanisms. In an exemplary embodiment in which the apparatus is embodied as a server or some other network devices, the user interface 72 may be limited, or eliminated. However, in an embodiment in which the apparatus is embodied as a communication device (e.g., the UE 50), the user interface 72 may include, among other devices or elements, any or all of a speaker, a microphone, a display, and a keyboard or the like.

In an exemplary embodiment, the processor 70 may be embodied as, include or otherwise control an access manager 80. The access manager 80 may be any means such as a device or circuitry embodied in hardware, software or a combination of hardware and software (e.g., processor 70 operating under software control) that is configured to perform the corresponding functions of the access manager 80 as described below. In some embodiments, communication between the access manager 80 and other devices may be conducted via the processor 70. However, the access manager 80 could alternatively communicate with other devices or elements directly or via the communication interface 74.

The access manager 80 may be configured to store information (e.g., in the memory device 76 or in an internal memory) regarding access control for CSG cells. In this regard, for example, the access manager 80 may be configured to store information related to non-accessible CSG cells. In an exemplary embodiment, the access manager 80 may be configured to create, update and/or maintain at least a non-access register 82 (e.g., a blacklist or forbidden list) including identities of non-accessible CSG cells. In some embodiments, the access manager 80 may further be configured to store information relating to accessible CSG cells as well. Thus, for example, the access manager 80 may be configured to create, update and/or maintain an access register 84 (e.g., a whitelist) including identities of accessible CSG cells. However, in some embodiments functionality regarding maintaining the whitelist may be performed by a different device, or in a different manner exclusive from the scope of embodiments of the present invention.

In an exemplary embodiment, the access manager 80 may be configured to handle or assist in relation to attempts by the user or the UE 50 to access a CSG cell. As such, for example, a registration procedure may take place in which the network may check as to whether the UE has access rights to the CSG cell. If access is granted, the access manager 80 may be configured to update the access register 84 to include an identity (e.g., a unique cell identity, a group of cell identities or a group identifier such as a location area identifier (LAI) (e.g., if the CSG cell includes more than one cell), and/or the like) of the CSG cell. Meanwhile, if access is not granted, the network may inform the UE 50 that access will not be granted and the non-access register 82 may be updated as described below. The identity of the CSG cell may be generally referred to as a CSG cell identifier. In some instances, the eNB (e.g., eNB 42) of each cell, or at least CSG cells, may broadcast its CSG cell identifier. Alternatively, the CSG cell identifier of a particular node, AP or BS may be provided via standardized signaling.

In situations in which the UE 50 received notice that access is not to be granted to the UE 50, the access manager 80 may be configured to monitor communications between the UE 50 and the network (e.g., the eNB 42). Thus, if the network issues a rejection (in some cases along with a reason for the rejection, which may be a standard rejection message) of access to the UE 50, the access manager 80 may be configured to record an identity of the CSG cell in the non-access register 82.

In some embodiments, the specific information stored by the access manager 80 in the non-access register 82 may be varied. In this regard, in addition to the alternatives described above for identifying CSG cells, various alternatives may also exist for the storage of supplemental information along with the identification of the cell or cells that are non-accessible. For example, temporal information such as the time and/or date of the rejection, location information such as the position of the UE 50 at the time of the rejection, the reported cause for the rejection, and other information may be stored in association with the information indicative of the non-accessible cell identities. As such, for example, a list may be maintained for storing information that is specific to a particular rejection so that the UE 50 may distinguish a CSG case from already existing location area (LA) and/or tracking area (TA) cases.

Subsequently, the UE 50 may utilize the information stored in the non-access register 82 during mobility procedures to avoid attempting to camp in a cell that is identified in the non-access register 82. Accordingly, resources may be spared that might otherwise have been devoted to servicing another request by the UE 50 for access to the cell. Notably, the non-access register 82 may be utilized for both idle mode mobility procedures (e.g., autonomous cell reselection) and active mode mobility procedures (e.g., handover). Moreover, embodiments of the present invention may apply to autonomous mobility and manual CSG access attempts by a user.

In an exemplary embodiment, the access manager 80 may employ various techniques for managing the non-access register 82. For example, rather than just enabling updates to the non-access register 82 (and/or the access register 84) with respect to new identities to be added to the register, the access manager 80 may enable updates with respect to status as well. For example, if a CSG cell is identified on the non-access register 82, but at some later point the access requirements for the CSG cell are changed (or the UE 50 becomes a subscriber), the access manager 80 may receive an update with regard to the status of the CSG cell so that the CSG cell may be removed from the non-access register 82. Thus, the UE 50 may not be prevented from re-attempting to access the CSG cell at a later date. The updates with regard to status may be provided by the network. Furthermore, in some instances, the network may provide a listing of CSG identifiers based on the location of a particular UE and known CSGs with exclusive access requirements proximate to the location.

As another example of supplemental information that may be stored in association with CSG cell identities, time-based validity information may also be stored. In this regard, for example, a timing value defining a period of time during which the CSG cell identity should be considered blacklisted may also be stored. In some embodiments, rather than storing time-based validity information, CSG cell identities stored in the non-access register 82 may be maintained for a limited period of time. As such, for example, each entry in the non-access register 82 may be maintained for a limited period of time that may be maintained by a timer 86 or timing function. The timer 86 may be configured to count up or down or provide a signal or notification to the access manager 80 at a date and/or time offset from a start time by a predetermined period of time. In some embodiments, the timer 86 may be signaled or controlled by a network entity (e.g., by broadcast or dedicated signaling) or other standard signaling to inform the timer 86 of the amount of time for which a particular CSG cell identity should be maintained. Thus, for example, the timer 86 could be controlled by, or in communication with, the processor 70, the access manager 80 and/or the non-access register 82 in order to monitor the non-access register 82 with respect to maintaining stored CSG cell identities for time periods defined either by signaling from the network or by a predetermined amount of time. In an exemplary embodiment, the timer 86 may operate in a stand alone manner beginning to count for each new entry a predetermined amount of time, or a time period defined by the network, in response to the addition of the new entry. After the expiration of the time period or predetermined amount of time, the timer 86 may signal the access manager 80 to enable the access manager 80 to delete a corresponding CSG cell identity that has timed out from the non-access register 82.

Figure 3:
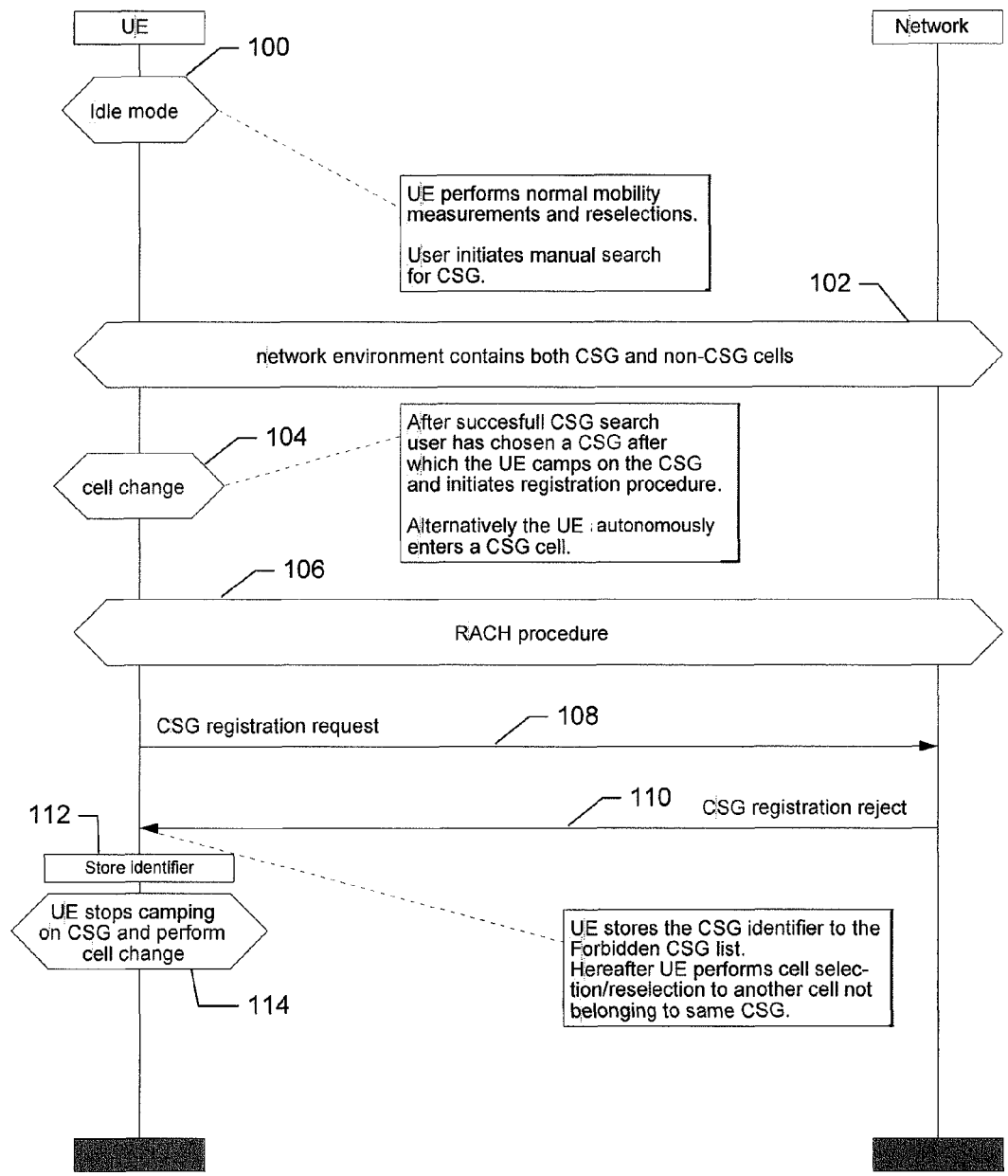
FIG. 3 illustrates an example of a control flow diagram showing communication between entities related to providing closed subscriber group access control according to an exemplary embodiment of the present invention.

FIG. 3 shows a control flow diagram illustrating signaling and responses of various entities in accordance with one exemplary embodiment of the present invention. As shown in FIG. 3, the UE may initially be in idle mode at operation 100. However, as discussed above, active or connected mode operation may also be supported. In the idle mode, the UE may perform normal mobility related measurements and cell reselections. In some instances, the user may initiate a manual search for CSGs. As shown at block 102, the network environment in which the UE is located may include both CSG and non-CSG cells. Thus, for example, the UE may have measurements for a CSG cell that would suggest that reselection be conducted to the CSG cell. At operation 104, a cell change may be prompted. In this regard, for example, after a successful CSG search, the user may select a CSG cell and the UE may attempt to camp on the CSG cell by initiating registration procedures. As an alternative, the UE may autonomously enter the CSG cell and initiate registration (e.g., based on the measurements).

At operation 106, random access channel (RACH) procedures may be conducted between the UE and the CSG cell. As such, the UE may issue a CSG registration request at operation 108. If the UE does not have access rights (e.g., is not a subscriber) for the CSG cell, the network (e.g., a processor of a network device of the E-UTRAN executing instructions stored in a memory device) may issue a CSG registration reject message at operation 110. The reject message may include a CSG cell identifier of the CSG cell (and/or a list of CSG identifiers) and potentially also supplemental information as described above. At operation 112, the access manager of the UE may store the CSG cell identifier to the non-access register 82 (e.g., the forbidden list or blacklist). Thereafter, the UE may perform cell selection or re-selection to another cell that is not part of the same CSG. Furthermore, at operation 114, the UE may stop camping on the CSG cell and perform a cell change.

Figure 4:
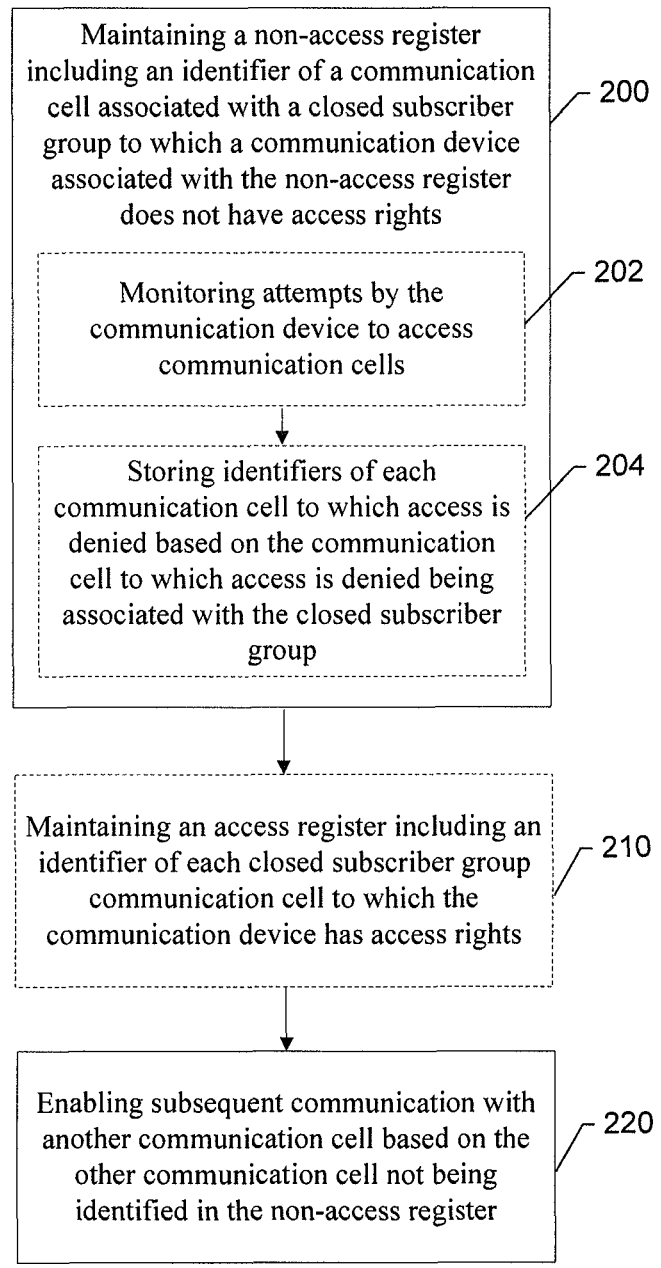
FIG. 4 is a flowchart according to an exemplary method of providing closed subscriber group access control according to an exemplary embodiment of the present invention.

FIG. 4 is a flowchart of a system, method and program product according to exemplary embodiments of the invention. It will be understood that each block or step of the flowchart, and combinations of blocks in the flowchart, can be implemented by various means, such as hardware, firmware, and/or software including one or more computer program instructions. For example, one or more of the procedures described above may be embodied by computer program instructions. In this regard, the computer program instructions which embody the procedures described above may be stored by a memory device of a mobile terminal or node and executed by a processor in the mobile terminal or node. As will be appreciated, any such computer program instructions may be loaded onto a computer or other programmable apparatus (i.e., hardware) to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s).

Accordingly, blocks or steps of the flowchart support combinations of means for performing the specified functions, combinations of steps for performing the specified functions and program instruction means for performing the specified functions. It will also be understood that one or more blocks or steps of the flowchart, and combinations of blocks or steps in the flowchart, can be implemented by special purpose hardware-based computer systems which perform the specified functions or steps, or combinations of special purpose hardware and computer instructions.

In this regard, one embodiment of a method for providing CSG access control as provided in FIG. 4 may include maintaining a non-access register including an identifier of a communication cell associated with a closed subscriber group to which a communication device associated with the non-access register does not have access rights at operation 200 and enabling subsequent communication with another communication cell based on the other communication cell not being identified in the non-access register at operation 220. As used herein, the term communication cell should be understood to correspond to an area covered by a wireless communication node, access point or base site. As such, a communication cell as referred to herein, need not be limited to association with cellular communications, but instead refers to areas covered by an associated wireless transmitter that may operate in accordance with any of a plurality of different communication protocols such as those listed above.

In some embodiments, certain ones of the operations above may be modified or further amplified as described below. It should be appreciated that each of the modifications or amplifications below may be included with the operations above either alone or in combination with any others among the features described hereafter. In this regard, for example, maintaining the non-access register may include storing supplemental information associated with the identifier in the non-access register. In another exemplary embodiment, maintaining the non-access register may include updating the non-access register based on changes in status with respect to accessibility of the closed subscriber group. In some embodiments, enabling subsequent communication may include blocking attempts to access a cell in the non-access register, but otherwise allowing such attempts.

In some exemplary embodiments, further optional operations may be included, examples of which are shown in dashed lines in FIG. 4. In this regard, the method may further include maintaining an access register including an identifier of each closed subscriber group communication cell to which the communication device has access rights at operation 210. If the access register is also maintained, enabling subsequent communication may include blocking attempts to access a cell identified in the non-access register and allowing subsequent attempts to access a cell identified in the access register.

In an exemplary embodiment, operation 200 may be further defined by additional operations. In this regard, for example, maintaining the non-access register may include monitoring attempts by the communication device to access communication cells at operation 202 and storing identifiers of each communication cell to which access is denied based on the communication cell to which access is denied being associated with the closed subscriber group at operation 204. In some instances, storing the identifiers may include storing the identifiers for a predetermined period of time. Furthermore, in some cases, storing the identifiers for the predetermined period of time may include storing the identifiers for a time period provided by a network device.

In an exemplary embodiment, an apparatus for performing the method above may include a processor (e.g., the processor 70) configured to perform each of the operations (200-220) described above. The processor may, for example, be configured to perform the operations by executing stored instructions or an algorithm for performing each of the operations. Alternatively, the apparatus may include means for performing each of the operations described above. In this regard, according to an exemplary embodiment, examples of means for performing operations 200 to 220 may include, for example, an algorithm for managing registration operations and maintenance of the non-access register (and possibly also the access register). As such, for example, means for performing operation 200 to 220 may include the access manager 80 and/or the processor 70.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for a communication device comprising:
    maintaining a non-access register for said communication device including an identifier of a communication cell within a mobile network for long-term evolution and associated with a closed subscriber group to which the communication device does not have access rights; and
    enabling subsequent communication with another communication cell based on the another communication cell not being identified in the non-access register;
    wherein maintaining the non-access register comprises:
    updating of the non-access register by the communication device by monitoring attempts of the communication device to access communication cells,
    storing identifiers of each communication cell to which access is denied based on the communication cell to which access is denied being associated with the closed subscriber group, and
    updating the non-access register based on changes in status with respect to accessibility of the closed subscriber group.

2. The method of claim 1, further comprising maintaining an access register for said communication device including an identifier of each closed subscriber group communication cell to which the communication device has access rights.

3. The method of claim 2, wherein enabling subsequent communication comprises allowing subsequent attempts to access a cell identified in the access register.

4. The method of claim 1, wherein enabling subsequent communication comprises blocking attempts to access a cell identified in the non-access register.

5. The method of claim 1, wherein storing the identifiers comprises storing the identifiers for a predetermined period of time.

6. The method of claim 5, wherein storing the identifiers for the predetermined period of time comprises storing the identifiers for a time period provided by a network device.

7. The method of claim 1, wherein the changes in status with respect to accessibility of the closed subscriber group comprise at least one of:
    change of access requirements of a cell identified in the non-access register and associated with the closed subscriber group, and
    change of access rights of the communication device to the closed subscriber group.

8. A computer program product comprising at least one non-transitory computer-readable storage medium having computer-executable program code instructions stored therein, the computer-executable program code instructions comprising:
    first program code instructions for maintaining a non-access register for a communication device including an identifier of a communication cell within a mobile network for long-term evolution and associated with a closed subscriber group to which the communication device associated with the non-access register does not have access rights; and
    second program code instructions for enabling subsequent communication with another communication cell based on the another communication cell not being identified in the non-access register;
    wherein maintaining the non-access register comprises:
    updating of the non-access register by the communication device by monitoring attempts of the communication device to access communication cells,
    storing identifiers of each communication cell to which access is denied based on the communication cell to which access is denied being associated with the closed subscriber group, and
    updating the non-access register based on changes in status with respect to accessibility of the closed subscriber group.

9. A communication device comprising:
    at least one processor; and
    at least one memory including computer program code,
    the at least one memory and the computer program code configured, with the at least one processor, to cause the communication device to perform at least the following:
    maintain a non-access register including an identifier of a communication cell within a mobile network for long-term evolution and associated with a closed subscriber group to which the communication device does not have access rights; and
    enable subsequent communication with another communication cell based on the another communication cell not being identified in the non-access register;
    wherein the at least one memory and the computer program code are configured, with the at least one processor, to cause the communication device to maintain the non-access register comprising:
    updating of the non-access register by monitoring attempts of the communication device to access communication cells,
    storing identifiers of each communication cell to which access is denied based on the communication cell to which access is denied being associated with the closed subscriber group, and
    updating the non-access register based on changes in status with respect to accessibility of the closed subscriber group.

10. The communication device of claim 9, wherein the at least one memory and the computer program code are further configured, with the at least one processor, to maintain an access register including an identifier of each closed subscriber group communication cell to which the communication device has access rights.

11. The communication device of claim 10, wherein the at least one memory and the computer program code are configured, with the at least one processor, to enable subsequent communication via allowing subsequent attempts to access a cell identified in the access register.

12. The communication device of claim 10, wherein the changes in status with respect to accessibility of the closed subscriber group comprise at least one of:
   change of access requirements of a cell identified in the non-access register and associated with the closed subscriber group, and
   change of access rights of the communication device to the closed subscriber group.

13. The communication device of claim 9, wherein the at least one memory and the computer program code are configured, with the at least one processor, to enable subsequent communication via blocking attempts to access a cell identified in the non-access register.

14. The communication device of claim 9, wherein the at least one memory and the computer program code are configured, with the at least one processor, to store the identifiers by storing the identifiers for a predetermined period of time.

15. The communication device of claim 14, wherein the at least one memory and the computer program code are configured, with the at least one processor, to store the identifiers for the predetermined period of time by storing the identifiers for a time period provided by a network device.

* * * * *